Sept. 11, 1962        C. A. REINHARD        3,053,424
CARRIER FOR CIRCULAR SAW BLADES
Filed Aug. 4, 1960        3 Sheets-Sheet 1
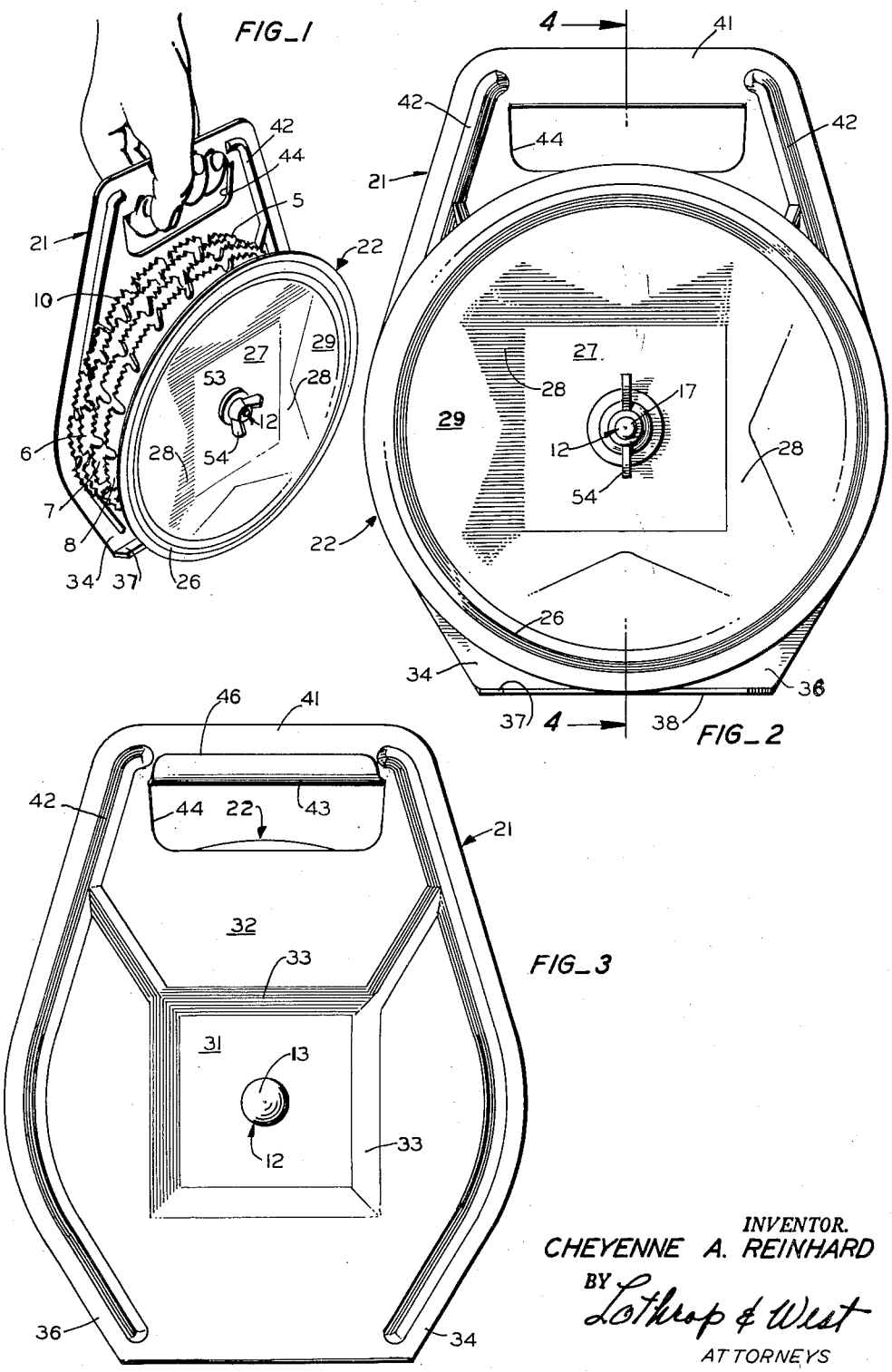
INVENTOR.
CHEYENNE A. REINHARD
BY Lothrop & West
ATTORNEYS Sept. 11, 1962  C. A. REINHARD  3,053,424
CARRIER FOR CIRCULAR SAW BLADES
Filed Aug. 4, 1960  3 Sheets-Sheet 2
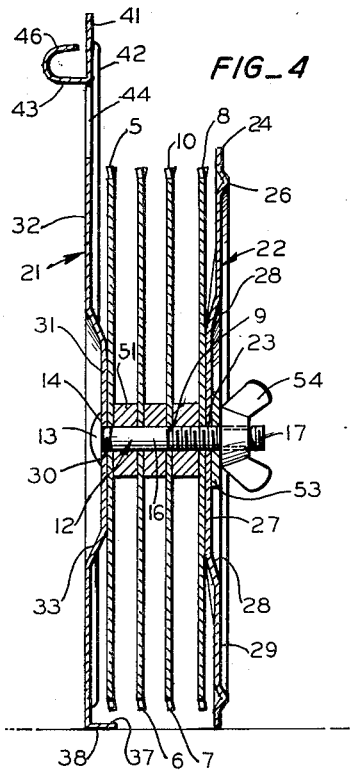
FIG_4
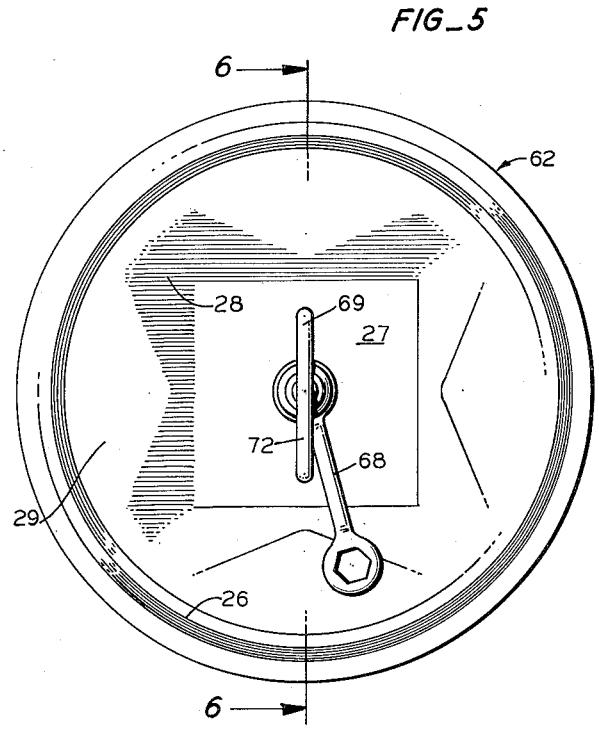
FIG_5
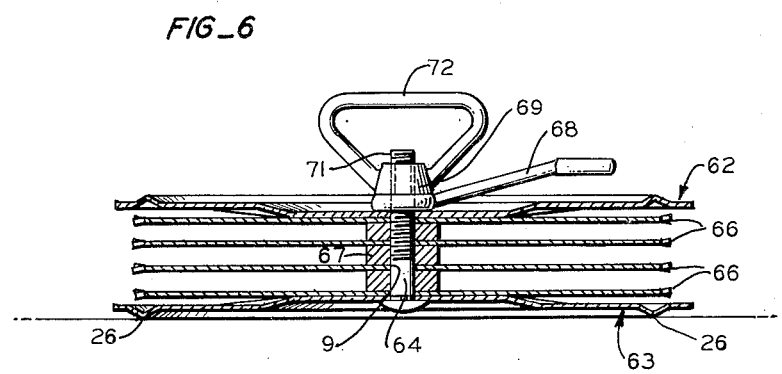
FIG_6
INVENTOR.
CHEYENNE A. REINHARD
BY *Lothrop & West*
ATTORNEYS

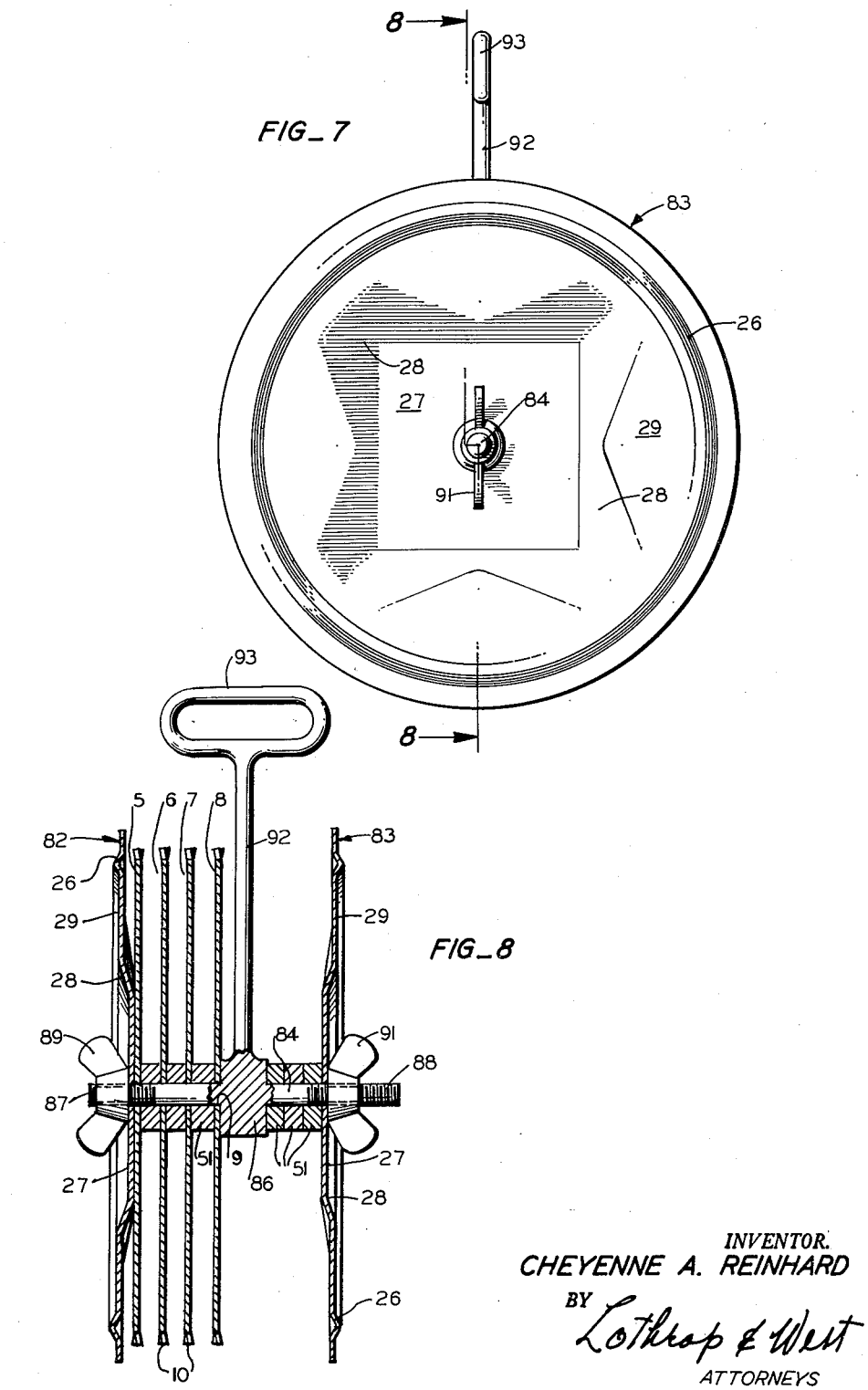

United States Patent Office 3,053,424
Patented Sept. 11, 1962

3,053,424
CARRIER FOR CIRCULAR SAW BLADES
Cheyenne A. Reinhard, Hayward, Calif.
(594 Beatrice St., San Leandro, Calif.)
Filed Aug. 4, 1960, Ser. No. 46,635
1 Claim. (Cl. 224—45)

My invention relates to a carrier particularly useful by artisans such as carpenters for holding and carrying or retaining one or more circular saw blades for use on the job or for transporting one or a plurality of such blades between the job and a place of storage or repair and sharpening.

The customary circular saw blade has a central aperture therethrough and is generally a planar member having a predetermined radius and having peripheral teeth which are so set that the axial dimension of the saw blade at the periphery is somewhat greater than the axial dimension at the center aperture.

On the job, saw blades are very often used under adverse conditions, and become bent or nicked or chipped or dulled in various ways. Also, it is necessary to change saw blades from time to time, usually due to increasing dullness, and it is necessary to transport the blades from place to place.

It is therefore an object of the invention to provide a carrier primarily for use under the indicated circumstances and which will assist the artisan in caring for the blades, particularly when they are new and sharp, for protecting and guarding them and for assisting in readily transporting them to and from the job. Also, an object is to provide a carrier useful for affording storage space not only for new, sharp blades, but also for used, dull blades.

Another object of the invention is to provide a carrier which is sufficiently economical to construct and finish so as to be readily salable to the trade.

Another object of the invention is in general to provide an improved carrier for circular saw blades.

An additional object of the invention is to provide a carrier for circular saw blades which can be embodied in a number of different, practical forms.

Other objects, together with the foregoing, are attained in the embodiments of the invention described in the accompanying description and illustrated in the accompanying drawings, in which:

FIGURE 1 is a perspective view showing one form of carrier pursuant to the invention as it is held by a user.

FIGURE 2 is a front elevation of the structure depicted in FIGURE 1.

FIGURE 3 is a rear elevation of the structure depicted in FIGURE 1.

FIGURE 4 is a cross section, the plane of which is indicated by the line 4—4 of FIGURE 2.

FIGURE 5 is a plan of a modified form of carrier pursuant to the invention.

FIGURE 6 is a cross section, the plane of which is indicated by the line 6—6 of FIGURE 5.

FIGURE 7 is a front elevation of a further modified form of carrier pursuant to the invention.

FIGURE 8 is a cross section, the planes of which are indicated by the lines 8—8 of FIGURE 7.

A carrier of a somewhat similar nature to the one set forth herein is disclosed in my copending application entitled Circular Saw Blade Holder and Carrier, Serial No. 8,609, filed February 15, 1960. While the carrier shown in such application has been and is satisfactory for many different purposes, it has been developed and commercially improved substantially as disclosed herein.

In the form especially shown in FIGURES 1 to 4, the carrier is particularly adapted for use in carrying one or more circular saw blades, such as 5, 6, 7 and 8. The most often used blades are as described above. Each has a central aperture 9 therein (FIGURE 4) and has a predetermined radius and circumference. Each blade also has a predetermined axial thickness near the center, and around its periphery is provided with teeth 10 having a set so that the axial thickness of the saw blade at the outer edge is greater than the central thickness thereof.

Especially for use with such blades, I provide a shaft 12 which conveniently can be formed similar to the customary carriage bolt. The shaft has a rounded head 13 and a short, non-circular portion 14 immediately adjacent thereto which merges with a central circular cylindrical portion 16 ending in a threaded end 17.

Adapted to cooperate with the shaft 12 are end plates 21 and 22. These are for the most part duplicates, although there are a few variations. The end plate 22, which can be considered as a front plate, is preferably fabricated of sheet material, such as sheet metal, of generally uniform thickness, and is provided with a central hole 23 adapted readily to accommodate the portion 14 of the shaft 12. The outer periphery 24 of the end plate is centered on the hole 23 and is somewhat greater in radius than that of the circular saw blades 5, 6, 7 and 8.

The end plate 22 is embossed or stamped near the periphery with an outwardly directed reinforcing bead 26 of arcuate cross section. Adjacent its center, the plate 22 is provided with a relatively raised central portion 27 conveniently of substantially square aspect. This merges through inclined portions 28 with a relatively depressed peripheral portion 29. With this configuration or cross section, the center part of the end plate 22 can lie immediately adjacent to or in contact with a saw blade, whereas the peripheral portion of the end plate 22 is then necessarily spaced from the saw blade to afford adequate clearance with respect to the saw teeth. Even if the end plate 22 is assembled backward, the bead 26 contacts the saw blade at a lesser radius than the teeth and so serves to prevent contact with the teeth themselves.

The end plate 21 for the most part has substantially the same configuration and contour as the end plate 22, being provided with a central square or non-circular hole 30 to fit the portion 14, a raised central portion 31, and a relatively depressed peripheral portion 32, connected by inclined portions 33. Some of the periphery of the end plate 21 is of the same arcuate curvature as that of the end plate 22. In addition, the end plate 21 has a pair of extensions 34 and 36 (FIGURE 2), having bounding edges that are substantially tangent to the arcuate portions of the end plate. Each of the extensions 34 and 36 is bent to provide a turned foot 37 directed toward the front plate 22. The lower face 38 of each foot 37 occupies substantially a plane tangent to the lowest point of the front end plate 22 when the mechanism is in the position shown. The inturned feet 37, together with the tangent part of the front plate 22, form a three point stand or support or rest for the carrier when it is placed on a substantially flat surface.

The rear end plate 21 also departs from the contour of the front plate 22 by reason of an extension 41, the margins of which are in part tangent to the circular periphery of the end plate and in part are substantially parallel to the lower face 38 of the rest portions 37. Certain embossed ribs 42 add to the stiffness of the upwardly projecting portion.

From the extension 41 there is struck a tongue 43 which is partially severed or cut on three sides to leave an opening 44 in the rear plate large enough to receive the user's fingers. The tongue 43 is shaped and curled or curved to afford a thick handle 46, engageable by the user's fingers.

In use, the device shown in the first four figures is assembled as indicated in FIGURES 1 and 4, with the rear plate 21 and the central shaft 12 in position. A saw blade, such as 5, is threaded over the shaft 12 and abuts the raised central portion 31 of the rear end plate. There is then threaded on the central shaft a spacer 51. This is preferably in the form of a thick washer of sufficient axial dimension so that an adjacent saw blade 6 also threaded over the central shaft is kept well away from tooth contact with the first saw blade. Additional spacers and saw blades are assembled until sufficient have been positioned. Then the front end plate 22 is likewise positioned on the central shaft. Conveniently, a terminal washer 53 is positioned on the central shaft and a wing nut 54 is engaged with the threaded end 17 and is screwed home. The entire assembly is thus clamped in position with the raised central portions facing each other. This provides a carrier having the attributes and obtaining the objectives mentioned.

As a variant form of device, there is provided a structure as shown in FIGURES 5 and 6. This carrier is made up of an end plate 62 duplicating the end plate 22 and is inclusive of another end plate 63, also duplicating the end plate 22. The end plates 62 and 63 are associated with a central shaft 64, previously as described, and are assembled with saw blades 66 and intervening spacers 67 in the same way. To replace the terminal washer 53 it is often convenient to assemble a flat box wrench 68 on the shaft 64. That is, a wrench 68 useful in connection with the saw blades and having a ring end is placed over the shaft 64. Finally a nut 69 of special characteristics is screwed onto the threaded end 71 of the shaft 64. The nut 69 is like a wing nut but preferably has the wings formed into a closed loop 72 of sufficient extent to constitute a carrying handle. In this instance the carrier is not normally rested with the saws in a vertical direction, but rather is placed on a flat surface with the embossed bead 26 serving as a spacer and with the handle 72 uppermost in the center portion of the carrier. The device of FIGURES 5 and 6 is handled and works in substantially the same manner as the device of the first four figures.

As a further alternative, the device shown in FIGURES 7 and 8 is utilized. In this form of the invention there are provided end plates 82 and 83, both of which are duplicates of the end plate 22. These are threaded over a central shaft 84 between its ends united with a boss 86. The shaft 84 has opposite threaded portions 87 and 88 for receiving wing nuts 89 and 91 respectively. The central boss 86 has a rod 92 proceeding radially therefrom and terminating in a looped handle 93 beyond the periphery of the end plates 82 and 83.

In this arrangement, the assembly on each side of the central boss 86 is substantially as previously described, but an especial feature is that new, sharp blades can be installed on one side of the central boss 86 and can be returned to the other side of the central boss 86 when they are worn and dull, the handle 93 thus serving as a marker between blades of different characteristics.

In all forms of the carrier, there is provided an improved device for attaining the objects of the invention.

What is claimed is:

A carrier for a circular saw blade having a central aperture therein and beyond a predetermined diameter having peripheral saw teeth of greater axial dimension than the portion of said saw blade within said predetermined diameter comprising a first end plate of uniformly thick metal having a central aperture adapted to register with the central aperture in said saw blade and having a first portion immediately surrounding said aperture and within said predetermined diameter adapted to abut said saw blade and having a second portion surrounding said first portion and offset therefrom to clear said saw blade and said teeth thereon, a tongue partially severed from said first end plate to leave an aperture therein and bent to form a handle, a foot extending perpendicularly from one edge of said first end plate, a second end plate of uniformly thick metal having a central aperture adapted to register with the central aperture in said saw blade and having a first portion immediately surrounding said aperture and within said predetermined diameter adapted to abut said saw blade and having a second portion surrounding said first portion and offset therefrom to clear said saw blade and said teeth thereon, a shaft adapted to pass through said apertures in said first end plate and said saw blade and said second end plate, and means engaging said first portion of said first end plate and said first portion of said second end plate for retaining said end plates on said shaft.

References Cited in the file of this patent

UNITED STATES PATENTS

| | | |
|---|---|---|
| 533,079 | Parker | Jan. 29, 1895 |
| 1,493,381 | Phelps | May 6, 1924 |
| 1,500,136 | Knowlton | July 8, 1924 |
| 2,501,037 | Fox | Mar. 21, 1950 |
| 2,601,426 | Baumann | June 24, 1952 |
| 2,631,725 | Miller | Mar. 17, 1953 |